United States Patent
Shin et al.

(10) Patent No.: US 8,798,208 B2
(45) Date of Patent: Aug. 5, 2014

(54) APPARATUS AND METHOD FOR DETECTING CODE

(71) Applicant: Electronics and Telecommunications Research Institute, Daejeon (KR)

(72) Inventors: Eun Jeong Shin, Daejeon (KR); Dae Ho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/826,241

(22) Filed: Mar. 14, 2013

(65) Prior Publication Data

US 2014/0037028 A1  Feb. 6, 2014

(30) Foreign Application Priority Data

Aug. 1, 2012  (KR) ......................... 10-2012-0084341

(51) Int. Cl.
   *H04L 7/10*  (2006.01)

(52) U.S. Cl.
   USPC ........... 375/340; 375/316; 375/342; 375/344; 375/354; 375/359; 375/362; 375/365; 375/366; 375/368; 375/259

(58) Field of Classification Search
   CPC .............. H04B 1/7083; H04B 1/7087; H04B 2001/1072; H04J 11/0069; H04J 11/0076; H04J 11/0073; H04J 11/0086; H04J 11/0089; H04J 11/0093; H04J 2211/005; H04J 3/0605; H04J 3/0608; H04L 27/2657; H04L 27/2666
   USPC ......... 375/316, 340, 342, 344, 354, 359, 362, 375/365, 366, 368, 259
   See application file for complete search history.

(56) References Cited

U.S. PATENT DOCUMENTS

| 8,447,005 | B2 * | 5/2013 | Axmon et al. | 375/365 |
| 2009/0257409 | A1 * | 10/2009 | Chang et al. | 370/336 |
| 2012/0275379 | A1 * | 11/2012 | Swarts et al. | 370/328 |

(Continued)

FOREIGN PATENT DOCUMENTS

KR  10-2011-0017547  2/2011

OTHER PUBLICATIONS

Kim, II Gyu et al., "Neighbor Cell Search Scheme using Partial Interference Cancellation of Primary Synchronization Code," Electronics Letters, vol. 44(21), 16 pages (2008).

(Continued)

*Primary Examiner* — Siu Lee
(74) *Attorney, Agent, or Firm* — Nelson Mullins Riley & Scarborough LLP; Anthony A. Laurentano, Esq.

(57) ABSTRACT

Disclosed is an apparatus and method for detecting a code. The code detecting apparatus may include a detector to detect symbol synchronous timing information associated with a PSS code from a first signal received during a predetermined first period, a compensator to extract and buffer the PSS code and the SSS code based on the symbol synchronous timing information detected from a second signal received during a predetermined second period, and compensate for a frequency offset with respect to the buffered PSS code, and a processor to re-detect the symbol synchronous timing information based on the PSS code in which the frequency offset is compensated for, and extract the buffered SSS code using the re-detected symbol synchronous timing information.

8 Claims, 4 Drawing Sheets

(56) References Cited

U.S. PATENT DOCUMENTS

| | | | |
|---|---|---|---|
| 2013/0121188 A1* | 5/2013 | Das et al. | 370/252 |
| 2013/0122822 A1* | 5/2013 | Srinivasan et al. | 455/67.13 |
| 2013/0176991 A1* | 7/2013 | Yi | 370/336 |
| 2013/0250818 A1* | 9/2013 | Gaal et al. | 370/277 |

OTHER PUBLICATIONS

Kim, Jung-In et al., "SSS Detection Method for Initial Cell Search in 3GPP LTE FDD/TDD Dual Mode Receiver," 9th International Symposium on Communications and Information Technology, ISCIT, pp. 199-203 (2009).

* cited by examiner

APPARATUS AND METHOD FOR DETECTING CODE

CROSS-REFERENCE TO RELATED APPLICATION

This application claims the priority benefit of Korean Patent Application No. 10-2012-0084341, filed on Aug. 1, 2012, in the Korean Intellectual Property Office, the disclosure of which is incorporated herein by reference.

BACKGROUND

1. Field of the Invention

The present invention relates to a technique for increasing a probability of extracting a secondary synchronization signal (SSS) code, by re-detecting symbol synchronous timing information associated with a primary synchronization signal (PSS) code extracted from a first signal, and by extracting the SSS code from a second signal received subsequent to the first signal.

2. Description of the Related Art

A long term evolution (LTE) terminal may estimate and compensate for a frequency offset in a time domain using a primary synchronization signal (PSS) code among buffered received signals, and compensate for each cyclic prefix (CP) in a channel with respect to a buffered secondary synchronization signal (SSS) code using a channel estimation coefficient with respect to the PSS code in which the frequency offset is compensated for.

In a process of buffering an SSS code and the PSS code using symbol synchronous timing information associated with the detected PSS code subsequent to detecting the PSS code, a probability of detecting the SSS code of the LTE terminal using the symbol synchronous timing information may be reduced as the symbol synchronous timing information associated with the PSS code is changed.

SUMMARY

An aspect of the present invention provides a technique for increasing a probability of extracting a secondary synchronization signal (SSS) code by re-detecting symbol synchronous timing information associated with a primary synchronization signal (PSS) code extracted from a first signal, and extracting the SSS code from a second signal received subsequent to the first signal using the re-detected symbol synchronous timing information.

According to an aspect of the present invention, there is provided an apparatus for detecting a code, the apparatus including a detector to detect symbol synchronous timing information associated with a primary synchronization signal (PSS) code from a first signal received during a predetermined first period, a compensator to extract and buffer the PSS code and a secondary synchronization signal (SSS) code based on the detected symbol synchronous timing information detected from a second signal received during a predetermined second period subsequent to the first period, and compensate for a frequency offset of the buffered PSS code, and a processor to re-detect the symbol synchronous timing information based on the PSS code in which the frequency offset is compensated for, and extract the buffered SSS code using the re-detected symbol synchronous timing information.

According to an aspect of the present invention, there is provided a method for detecting a code, the method including detecting symbol synchronous timing information associated with a primary synchronization signal (PSS) code from a first signal received during a predetermined first period, extracting and buffering the PSS code and a secondary synchronization signal (SSS) code based on the detected symbol synchronous timing information from a second signal received during a predetermined second period subsequent to the first period, and compensating for a frequency offset of the buffered PSS code, re-detecting the symbol synchronous timing information based on the PSS code in which the frequency offset is compensated for, and extracting the buffered SSS code using the re-detected symbol synchronous timing information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
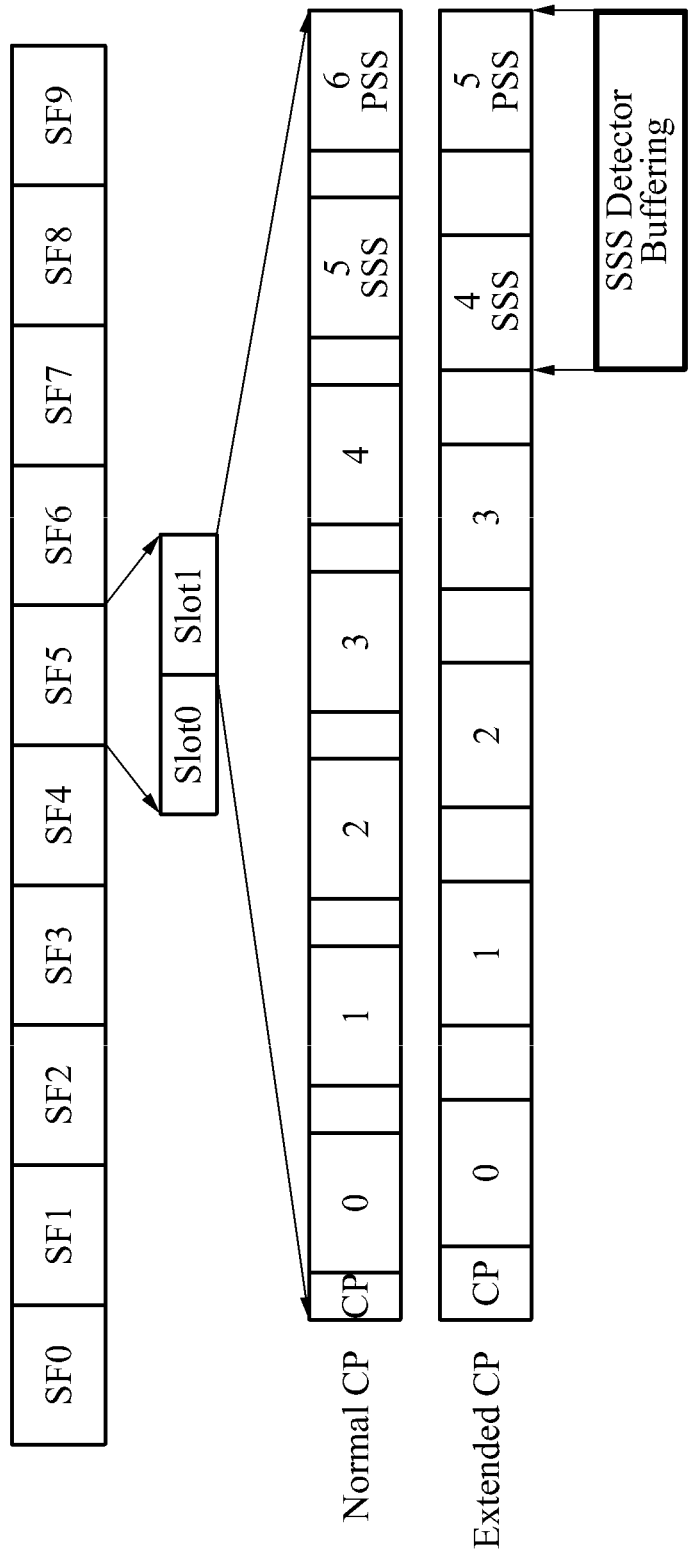
FIG. 1 is a diagram illustrating an example of a signal received in a code detecting apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined that a detailed description related to a related known function or configuration which may make the purpose of the present invention unnecessarily ambiguous in the description of the present invention, such detailed description will be omitted. Also, terminologies used herein are defined to appropriately describe the exemplary embodiments of the present invention and thus may be changed depending on a user, the intent of an operator, or a custom. Accordingly, the terminologies must be defined based on the following overall description of this specification.

FIG. 1 is a diagram illustrating an example of a signal received in a code detecting apparatus according to an embodiment of the present invention.

Referring to FIG. 1, the code detecting apparatus may extract three primary synchronization signal (PSS) codes from a signal received when detecting a cell in an early stage, detect a greatest PSS code among the extracted PSS codes, and detect a secondary synchronization signal (SSS) code, a cyclic prefix (CP) type, and a radio frame phase, using symbol synchronous timing information extracted when the greatest PSS code is extracted. For example, the received signal may include the PSS code and the SSS code for each period of 5 milliseconds (ms). Also, the received signal may include a signal in a normal CP type and an extended CP type.

Here, the code detecting apparatus may obtain symbol synchronization in a timing domain using the PSS code, and detect the SSS code based on the obtained symbol synchronization.

Further, in order to detect the SSS code, the code detecting apparatus may perform buffering for a length that is able to receive the PSS code and the SSS code for each CP type based on the symbol synchronization associated with the PSS code detected by a PSS code detector.

Figure 2:
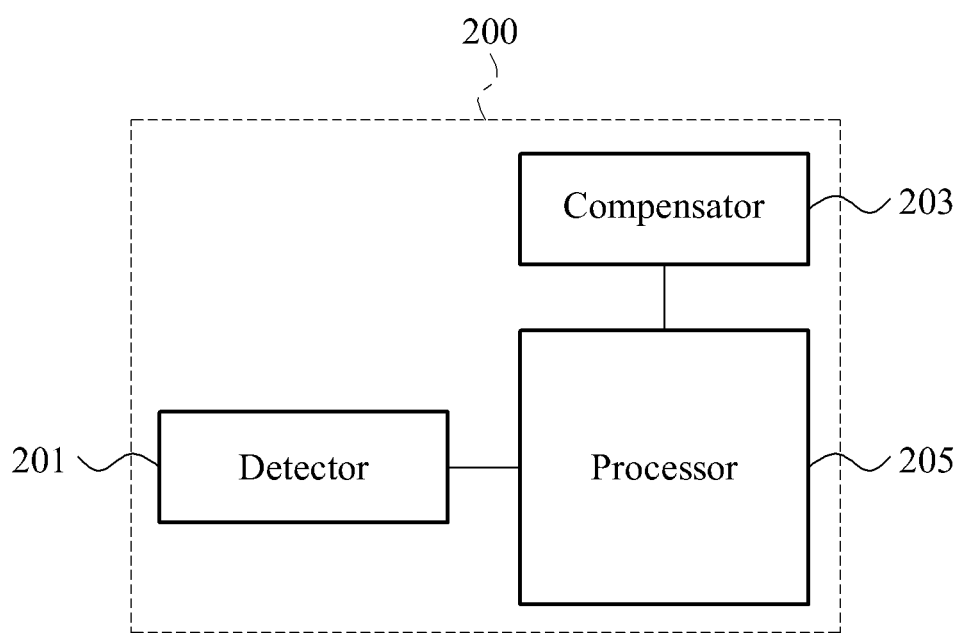
FIG. 2 is a diagram illustrating a configuration of a code detecting apparatus according to an embodiment of the present invention.

FIG. 2 is a diagram illustrating a configuration of a code detecting apparatus according to an embodiment of the present invention.

Referring to FIG. 2, the code detecting apparatus 200 may include a detector 201, a compensator 203, and a processor 205.

The detector 201 may detect a PSS code and symbol synchronous timing information associated with the PSS code from a first signal received during a predetermined first period. Here, the detector 201 for detecting the PSS code may be configured to be a correlator for each identification (ID) of the PSS code, operate the correlator using the first signal received in the timing domain, for example, for a 5 ms period, and accumulate a resulting value for the 5 ms period. The detector 201 may detect a timing domain at which the resulting value of the accumulated correlation in a form of the symbol synchronization timing information associated with the PSS code.

The compensator 203 may extract and buffer the PSS code and the SSS code based on the symbol synchronous timing information detected from a second signal received during a predetermined second period subsequent to the first period, and compensate for a frequency offset of the buffered PSS code. The compensator 203 may estimate the frequency offset based on the buffered PSS code, and compensate for the frequency offset of the buffered PSS code using the estimated frequency offset.

The processor 205 may re-detect the symbol synchronous timing information based on the PSS code in which the frequency offset is compensated for, and extract the buffered SSS code using the re-detected symbol synchronous timing information. Here, the processor 205 may re-detect the symbol synchronous timing information by multiplying the PSS code in which the frequency offset is compensated for and a conjugated value with respect to the buffered PSS code, by performing inverse fast Fourier transform (IFFT) on a value resulting from the multiplying, and by calculating a value resulting from performing the IFFT, and an impulse of the PSS code. The processor 205 may obtain a code extraction starting point using the re-detected symbol synchronous timing information, and extract the buffered SSS code for each type of cyclic prefix (CP) based on the code extraction starting point.

Also, the processor 205 may perform a fast Fourier transform (FFT) on the value resulting from performing the IFFT, extract a channel coefficient with respect to the value resulting from performing the FFT, and compensate for the extracted SSS code in a channel using the extracted channel coefficient. The processor 205 may correlate the buffered SSS code for a channel in which each CP type is compensated for and, for example, "167" of SSS codes, and obtain information with respect to an ID of the SSS code having a greatest resulting value, a sub-frame, and the CP type.

Figure 3:
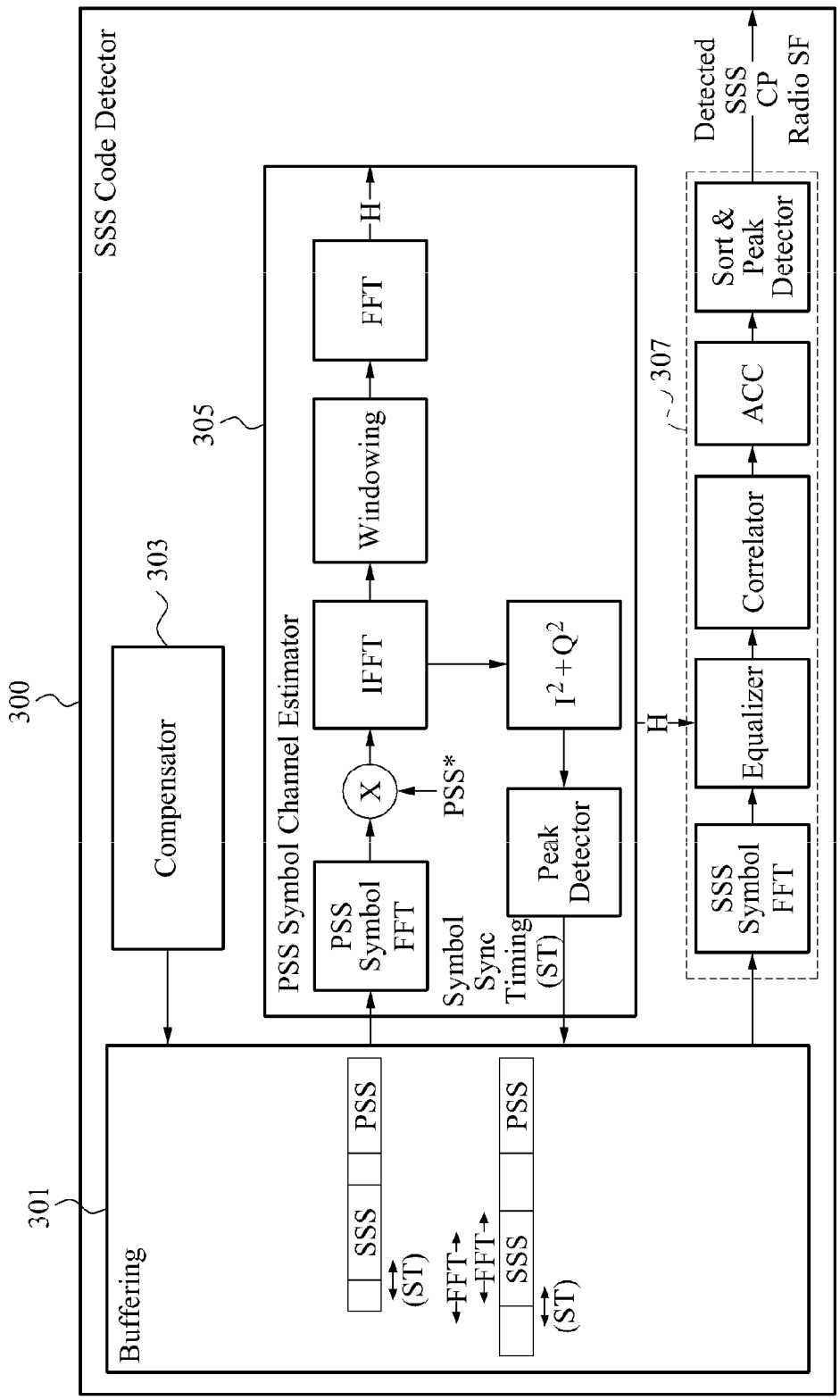
FIG. 3 is a diagram illustrating an example of configuring a secondary synchronization signal (SSS) code detecting apparatus according to an embodiment of the present invention.

FIG. 3 is a diagram illustrating an example of configuring a secondary synchronization signal (SSS) code detecting apparatus according to an embodiment of the present invention.

Referring to FIG. 3, the SSS code detecting apparatus 300 may include a buffer 301, a compensator 303, a PSS symbol channel estimator 305, and a detector 307.

The buffer 301 may store the extracted PSS code and the SSS code by the compensator 303.

The buffer 301 may buffer the PSS code and the SSS code using the symbol synchronous timing information of the PSS code detector primarily, estimate a frequency offset by the compensator 303 using the buffered PSS code to store a compensated value, and transmit the PSS code, in which the frequency offset is compensated for, to a PSS symbol channel estimator 305.

The compensator 303 may indicate a function block that buffers the PSS code and the SSS code since the SSS code detecting apparatus 300 starts operating, and compensates for the PSS code subsequent to estimating the frequency offset using the PSS code.

The PSS symbol channel estimator 305 may correlate the PSS code in which the frequency offset is compensated for and the conjugated PSS code, convert to a signal in the timing domain by performing an IFFT, detect a peak value, and re-detect the symbol synchronization information of the buffered PSS code in which the frequency offset is compensated for. The PSS symbol channel estimator 305 may perform FFT on the PSS code buffered from a point of the re-detected symbol synchronous timing information, correlate the buffered PPS code with the conjugated PSS code to be converted to the timing domain, remove a noise domain by windowing, and obtain an estimated value of the PSS code (H) by converting to a frequency domain.

That is, the PSS symbol channel estimator 305 may re-detect the symbol synchronous timing information by multiplying the PSS code in which the frequency offset is compensated for and the conjugated value with respect to the buffered PSS code, by performing an IFFT on the value resulting from the multiplying, and by calculating a value resulting from performing the IFFT and an impulse of the PSS code. Here, the PSS symbol channel estimator 305 may calculate a value of a domain removed by an impulse in a specific interval in the time domain of the value resulting from performing the IFFT, and remove the calculated noise from the value resulting from performing the IFFT. The PSS symbol channel estimator 305 may convert the value resulting from noise being removed, that is, the PSS code, to the frequency domain, and extract a channel coefficient of the frequency domain.

The SSS detector 307 may obtain a code extraction starting point using the re-detected symbol synchronization timing information, extract the SSS code for each CP type from the buffer 301 based on the code extraction starting point, and compensate for the extracted SSS code in the channel.

Also, the SSS detector 307 may correlate the SSS code buffered for a channel in which each CP is compensated for and an identification (ID) of SSS codes, for example, 164, and obtain information with respect to the ID of the SSS code with a greatest resulting value of the correlation, a sub-frame, and the CP type.

A code detecting apparatus according to an embodiment of the present invention may manage a change of symbol synchronous timing information actively by movement of a terminal including the code detecting apparatus, until the SSS code is detected using a current PSS code and SSS code in the symbol synchronous timing information of the detected PSS code using the PSS code, for example, prior to an interval of at least 5 ms. Also, the code detecting apparatus may increase a probability of detecting the SSS code as the code detecting apparatus constantly estimates symbol timing change between the PSS code timing synchronization detected in an initial PSS code detector and a PSS code being received.

Figure 4:
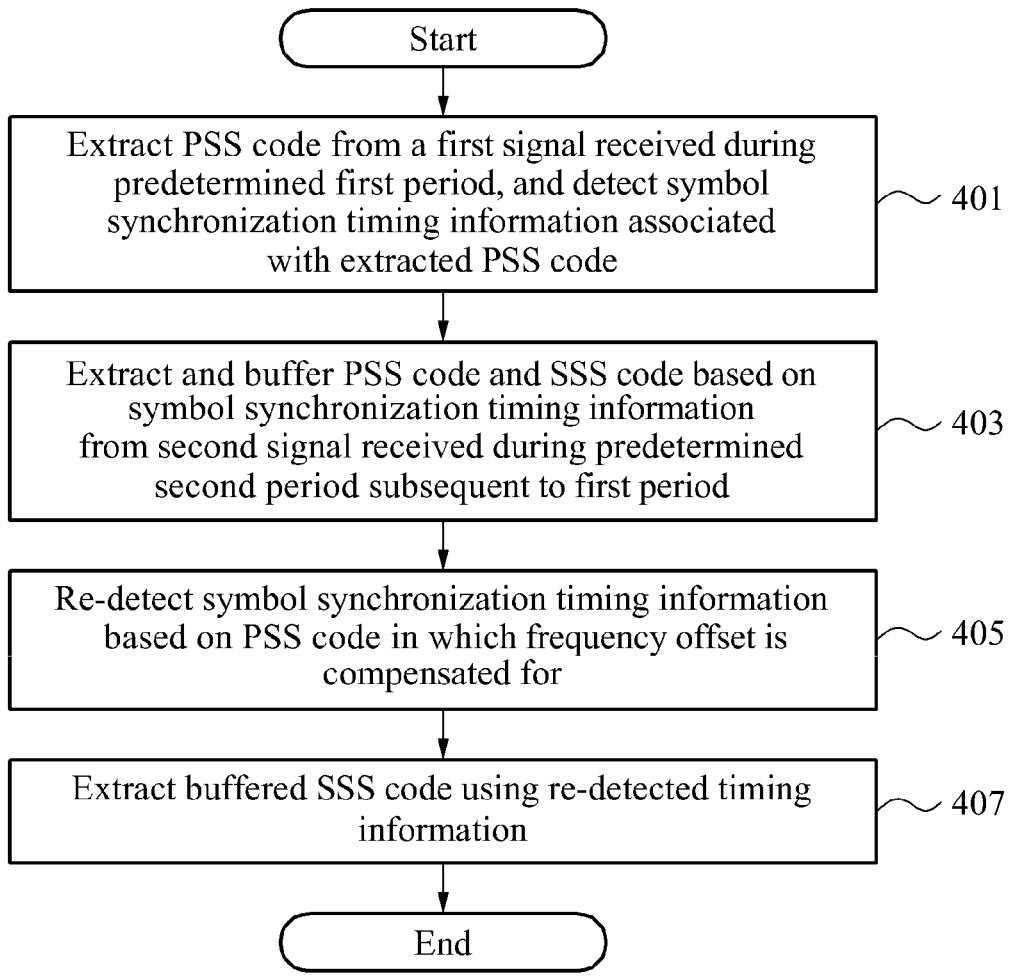
FIG. 4 is a flowchart illustrating a method for detecting a code according to an embodiment of the present invention.

FIG. 4 is a flowchart illustrating a method for detecting a code according to an embodiment of the present invention.

Referring to FIG. 4, in operation 401, a code detecting apparatus may detect symbol synchronous timing information associated with a PSS code and symbol synchronous timing information associated with the PSS code from a first signal received during a predetermined first period. Here, the code detecting apparatus may operate the first signal and a correlator, for example, for a 5 ms period, and may accumulate values resulting from the operating over the 5 ms period. The code detecting apparatus may detect timing at which a resulting value of the accumulated correlation is at maximum in a form of the symbol synchronous timing information associated with the PSS code.

In operation 403, the code detecting apparatus may extract and buffer the PSS code and the SSS code based on the symbol synchronous timing information from a second signal received during a predetermined second period subsequent to the first period, and estimate a frequency offset with respect to the buffered PSS code to compensate for the frequency offset. Here, the code detecting apparatus may estimate the frequency offset based on the buffered PSS code, and compensate for the frequency offset with respect to the buffered PSS code using the estimated frequency offset.

In operation 405, the code detecting apparatus may re-detect the symbol synchronous timing information based on the PSS code in which the frequency offset is compensated for. Here, the code detecting apparatus may re-detect the symbol synchronous timing information by multiplying the PSS code in which the frequency offset is compensated for and a conjugated value with respect to the buffered PSS code, by performing an IFFT on the value of resulting from the multiplying, and by calculating a value resulting from performing the IFFT, and an impulse of the PSS code.

In operation 407, the code detecting apparatus may extract the buffered SSS code using the re-detected symbol synchronous timing information. Here, the code detecting apparatus may obtain a code extraction starting point using the re-detected extraction starting point, and extract the buffered SSS code for each CP type based on the code extraction starting point. The code detecting apparatus may conduct a correlation for each SSS code ID using a channel coefficient that estimates the SSS code for each extracted CP type using the PSS code, and accumulate values resulting from the correlating over a predetermined period of time. The code detecting apparatus may output a combined value of an SSS code ID that has a greatest resulting correlation value among the values accumulated and a CP type.

The code detecting apparatus may perform an FFT on the buffered SSS code for each CP type with differing FFT starting points to be converted to a frequency domain, compensate for the SSS code of a channel converted to the frequency domain for each CP type based on the channel coefficient that estimates a channel using the PSS code, correlate 167 SSS codes conjugated for each sub-frame type, and detect an SSS code value that has a greatest correlation value subsequent to buffering a resulting value of the correlating for a 5 ms period. That is, the code detecting apparatus may correlate the buffered SSS code for a channel in which each CP type is compensated for, and, for example, 167 of SSS codes, and obtain information with respect to an ID of the SSS code with a greatest resulting value of the correlating, a sub-frame, and the CP type.

According to embodiments of the present invention, it is possible to increase a probability of extracting a secondary synchronization signal (SSS) code by re-detecting symbol synchronous timing information associated with a primary synchronization signal (PSS) code extracted from a first signal, and extracting the SSS code from a second signal received subsequent to the first signal using the re-detected symbol synchronization timing information.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for detecting a code, the apparatus comprising:
a detector to detect symbol synchronous timing information associated with a primary synchronization signal (PSS) code from a first signal received during a predetermined first period;
a compensator to extract and buffer the PSS code and a secondary synchronization signal (SSS) code based on the detected symbol synchronous timing information detected from a second signal received during a predetermined second period subsequent to the first period, and compensate for a frequency offset of the buffered PSS code; and
a processor to re-detect the symbol synchronous timing information based on the PSS code in which the frequency offset is compensated for, and extract the buffered SSS code using the re-detected symbol synchronous timing information.

2. The apparatus of claim 1, wherein the compensator estimates the frequency offset based on the buffered PSS code, and compensates for the frequency offset of the buffered PSS code using the estimated frequency offset.

3. The apparatus of claim 1, wherein the processor re-detects the symbol synchronous timing information by multiplying the PSS code in which the frequency offset is compensated for and a conjugated value with respect to the buffered PSS code, by performing an IFFT for a resulting value of the multiplying, and by calculating a value resulting from performing the IFFT and an impulse of the PSS code.

4. The apparatus of claim 1, wherein the processor obtains a code extraction starting point using the re-detected symbol synchronous timing information, and extracts the buffered SSS code for each cyclic prefix (CP) type based on the code extraction starting point.

5. A method for detecting a code, the method comprising:

detecting symbol synchronous timing information associated with a primary synchronization signal (PSS) code from a first signal received during a predetermined first period;

extracting and buffering the PSS code and a secondary synchronization signal (SSS) code based on the detected symbol synchronous timing information from a second signal received during a predetermined second period subsequent to the first period, and compensating for a frequency offset of the buffered PSS code;

re-detecting the symbol synchronous timing information based on the PSS code in which the frequency offset is compensated for; and extracting the buffered SSS code using the re-detected symbol synchronous timing information.

6. The method of claim 5, wherein the compensating for the frequency offset comprises:

estimating a frequency offset based on the buffered PSS code, and compensating for the frequency offset of the buffered PSS code using the estimated frequency offset.

7. The method of claim 5, wherein the re-detecting of the symbol synchronous timing information comprises:

re-detecting the symbol synchronous timing information by multiplying the PSS code in which the frequency offset is compensated for and a conjugated value with respect to the buffered PSS code, by performing an inverse fast Fourier transform (IFFT) for the value resulting from the multiplying, and by calculating a value resulting from performing the IFFT and an impulse of the PSS code.

8. The method of claim 5, wherein the extracting of the buffered SSS code comprises:

obtaining a code extraction starting point using the re-detected symbol synchronous timing information, and extracting the buffered SSS code for each cyclic prefix (CP) type based on the code extraction starting point.

* * * * *